Nov. 8, 1932.   G. D. REYNOLDS   1,887,216
ASSEMBLY MACHINE
Filed July 26, 1929   9 Sheets-Sheet 6

Inventor
George Dwight Reynolds
By his Attorneys
Usina & Rauber

Patented Nov. 8, 1932

1,887,216

UNITED STATES PATENT OFFICE

GEORGE DWIGHT REYNOLDS, OF ANN ARBOR, MICHIGAN, ASSIGNOR TO BAUSH MACHINE TOOL COMPANY, A CORPORATION OF MASSACHUSETTS

ASSEMBLY MACHINE

Application filed July 26, 1929. Serial No. 381,175.

My invention relates to a machine for assembling screw-threaded parts such as for screwing nuts onto bolts or similar threaded rods, or for screwing screws or other devices into threaded sockets.

An object of the invention is to provide a machine in which a number of nuts may be simultaneously screwed onto a corresponding number of bolts or threaded rods, or in which screws or similar elements may be screwed into threaded sockets, and for other manipulations of similar character.

In mounting or assembling nuts on bolts, etc., it is essential to the best result that each nut be screwed into place with a definite force and that, for this purpose, sufficient pressure be applied to the nut or screw as it is screwed into place to prevent it from becoming loose and, on the other hand, to avoid an excessive force or pressure that would impose an unnecessarily high strain on the bolt or screw.

In fastening bolts by hand the pressure to be applied has heretofore been left to the judgment of the mechanic and has, accordingly, varied with varying personal factors. In assembling a number of nuts on bolts the individual nuts may require different numbers of turns to attain the required tightness and, consequently, a uniform number of turns or rotations cannot be relied upon to obtain the required individual tightness.

Further objects of the invention are, therefore, to provide apparatus in which nuts or similar elements may be automatically assembled with a definite force; to provide apparatus in which a number of nuts may be assembled in position with a uniform force and with individual, independent numbers of turns, or with an equalized application of pressure; and to provide in apparatus of this type a construction in which pressure may be equally applied throughout the assembly for tightening of the nuts or other screw elements; to provide means for applying force for the assembly of the element up to a definite limit, and to then discontinue said force; and to provide simple and accurate means for controlling the application and discontinuance of said force.

Other objects of the invention are to provide simple and effective means for holding the nut in position convenient to the work; to provide means for effectively distributing and equalizing torque on several spindles, and for controlling the tightness with which the nuts or other elements are assembled.

In certain pressure applying and limiting means of the present invention a driven element is arranged to slip and thus stop upon attaining the torque limit. In certain cases a greater force is required to engage or clutch such elements than is required to hold the elements from slipping up to the maximum torque that is to be applied.

A further object of the invention is, therefore, to provide means whereby the limiting torque may be controlled or adjusted independently of the force required to engage the elements.

Other objects contributory or related to the above will be more fully apparent from the following description of the invention.

The various features of the invention are illustrated in the accompanying drawings, in which—

In my invention a wrench or wrench socket, or a number of wrenches or wrench sockets are arranged on a supporting spindle or spindles, or equivalent rotating means. In the embodiment shown by way of example in the accompanying drawings, two such sockets and spindles are shown. A nut or other element to be assembled or screwed onto the bolt is held in its wrench socket in any suitable manner, preferably electro-magnetically, as this furnishes a very convenient and effective means and affords flexibility and adaptability to the application of nuts or other elements in various positions. A rotating force or torque is applied to the several spindles through a slip clutch that transmits the torque against the resistance of the wrench or socket carrying spindles until a limiting resistance is reached, and then slips and permits the spindles to remain at rest.

When a number of nuts or other elements are to be assembled simultaneously, the torque transmitted through the clutch is distributed through an equalizing means by which an unequal or increased resistance encountered with any one nut or element reacts to proportionately speed up the rotation of the other spindles until each attains the same tightness, thus ensuring a uniform tightness or resistance among all of the nuts throughout their assembly.

In the embodiment of the invention shown in the accompanying drawings an epicyclic or differential gear is employed between the slip clutch and the driven spindles. In this manner an equality of tautness is at all times maintained, even though a greater number of turns may be required for one nut than for the others to attain the required tautness.

As the nuts are brought into position, the resistance to the turning of the spindles increases until the slip clutch slips, the clutch being so controlled and arranged that it will not slip until the nuts have been screwed into position with the desired tightness, and that it will, thereupon, fail to transmit any increased torque to further tighten the nut. When the clutch slips it actuates mechanism to discontinue the application of power to the driven spindles.

In the embodiment illustrated in the accompanying drawings a magnetic clutch is shown and the change in relative rotations or slackness of motion of one of the elements of the clutch actuates a switch controlling the supply of current to the electromagnet.

In certain cases the tightness required for the assembly of the elements may require a less powerful energization of the electromagnetic clutch than is required to initially engage the clutch. In such cases a starting current of the required clutch engaging magnitude is sent through the clutch and, upon the engagement of the clutch elements and their rotation, this current is shunted through a resistance and thereby decreased to that required to attain the limiting torque by which the clutch will slip.

Referring more particularly to the embodiment of the invention shown in the accompanying drawings, a connecting rod 20, on which a pair of nuts 21 and 22 are to be assembled, is placed on a holding bracket 23 which is, in turn, bolted to a work holding table 24. The table 24 is provided with a vertical guide plate 25 which is slidably held between a pair of vertical jibs 26 on a standard or column 27, the lower part of which is bolted to a suitable base 28. The work table 24 and bracket 23 are lifted upwardly by means of a foot pedal or lever 29 fulcrumed on a bracket 30 on the base 28 and connected by a link 31 to the lower end of a rod 32 which projects upwardly into a hole in the lower part of the table bracket guides 25 and is secured therein by set screws 33 to enable the relative position of the table and pedal 29 to be adjusted. When the outer end of the pedal or lever 29 is depressed, the lifting of the opposite end lifts the table 24 and bracket 23 through the link 31, the rod 32 and the guide plate 25, thus bringing the projecting threaded ends of bolts or studs on the connecting rod 20 upwardly into the lower ends of wrench or nut sockets 34 and 35 within which the nuts 21 and 22 are initially positioned.

Power for driving the wrenches or sockets 34 and 35 is supplied through a belt 36, or other means, to a pulley 37 keyed to a shaft 38 between an upper bearing 39 and a lower bearing 40 which are supported in suitable arms or brackets 41 and 42, respectively, of an upper extension 43 of the upright or column 27. The upper portion of the upright 43 may be formed integrally with the lower standard or column 27 but, for convenience, is preferably formed separately and joined thereto by means of a flange 44 projecting downwardly from its lower end and clamped to the front face of the upper part of the lower column 27 by means of bolts 45.

The bearings 39 and 40 may be of any suitable type but are preferably ball bearings. The upper ball bearing 39 is held within a circular ring or housing 46 engaged by the arms or brackets 41 and held in place by a top plate 47 and a lower ring 48. The lower ball bearing 40 is similarly enclosed within an encircling ring or housing 49 and upper and lower caps 50 and 51 which overlap the arms or brackets 42. The shaft 38 is adjustably mounted on the inner member of the ball bearing by means of upper and lower nuts 52 and 53 threaded in left handed and right handed direction, respectively, so that the rotation of the shaft tends to tighten the nuts. By loosening one nut and tightening the other, the position of the shaft 38 may be adjusted vertically.

On the lower end of the shaft 38 there is mounted a magnetic driving clutch member 54 supported and retained on the shaft by a projecting head or flange 55 on the lower end of the shaft. The clutch member 54 is splined to the shaft 38 and rotates therewith. A circular electro-magnet 56 is mounted in the lower face of the driving clutch member 54 and is connected in a circuit by means of suitable brushes and collecting rings, not shown.

Immediately below the lower face of the clutch member 54 is a driven clutch member which has an annular plate or ring 57, the upper face of which is spaced a very slight distance from the lower face of the member 54 and has set therein an annular iron disc 58 immediately beneath the electro-magnet 56. The ring 57 is supported in position beneath the member 54 by means of a thin annular disc or plate 59 bolted at its outer edge to the disc or ring 57, and at its inner edge bolted to the upper face of a differential housing 60. The differential housing 60 is rotatably mounted at its upper end by means of a ball bearing 61 on the upper end of a sleeve or quill 62 which is, in turn, mounted on an inner co-axial shaft 63. The upper end of the quill 62 fits on a squared part 64 of the shaft 63 and is centered on and rotates with the shaft 63. The quill 62 extends down only to the mid part of the differential housing 60. The differential housing 60 is mounted and supported at its lower end by means of a thrust ball bearing 65 which is supported on a lower quill 66 freely rotatable on the shaft 63 and extending downwardly from the lower end of the upper sleeve or quill 62. The upper quill 62 is held against longitudinal displacement relative to the shaft by means of nuts 67 threaded on the upper end of the shaft 63 and is supported on the differential housing 60 by the ball bearings 61 which, for this purpose, act also as thrust bearings.

The lower part of the quill 66 is journaled in and supported by a ball bearing 68 which is mounted in a shell 69 and supported by upper and lower flanged retainers 70 and 71, in encircling arms or brackets 72 extending forwardly from the upright 43. The inner member of the bearing is enclosed between a shoulder 73 on the quill below the bearing and a lock nut 74 above the bearing.

Figures 3, 13:
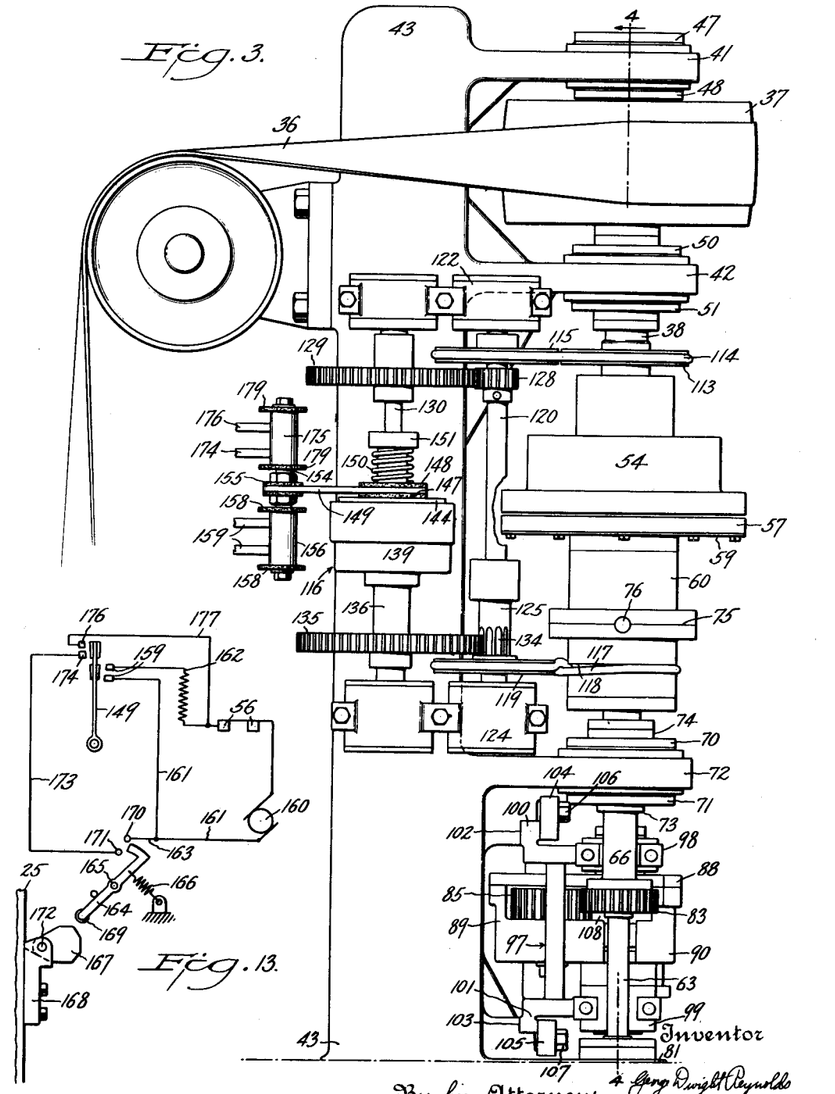
Fig. 3 is a vertical side elevation of the upper part of the machine showing the driving and controlling parts of the apparatus.
Fig. 13 is a diagrammatic view of a circuit arrangement for controlling the limiting torque.

The differential casing 60 is split on a horizontal plane as at 75 in Fig. 3, and provided with bearings for short shafts 76 on which the outer bevel gears 77 are mounted between an upper bevel gear 78 splined to the upper sleeve or quill 62 and a lower bevel gear 79 splined to the lower quill 66. It will thus be apparent that as the differential housing 60 is rotated, it tends to rotate with it and in the same direction, both the upper quill 62 on the shaft 63 and the lower quill 66. In the event, however, that greater resistance to rotation is offered by the shaft 63 than by the quill 66, or vice versa, and a corresponding bevel gear 78 or 79 tends to slow down to a speed below that of the principal housing, the outer bevel gears 77 are driven forwardly and rotated, thus increasing proportionately the rotation of the other bevel gear 79 or 78, respectively, until the resistance to rotation is again equalized. Thus, although the resistance to rotation of the shaft 63 and of the quill 66 may increase, an increase of one relative to the other is immediately compensated by an increasing speed of the shaft or quill offering less resistance until the resistance and, correspondingly, the driving torque are equalized.

The lower end of the shaft 63 extends through a ball bearing 80 supported in brackets or arms 81 extending forwardly from the lower end portion of the upper column 43, and on the lower end of the shaft 63 is mounted the nut receiving socket or wrench 34. The ball bearing 80 is retained in position on the shaft 63 by upper and lower flange rings 82. The other socket or wrench 35 is driven from the lower sleeve or quill 66 by means of gear teeth formed on an enlarged hub 83 on the lower end of the sleeve 66. A ball bearing 84 is provided within the hub 83 and between the shaft 63 and the quill 66.

Figure 4:
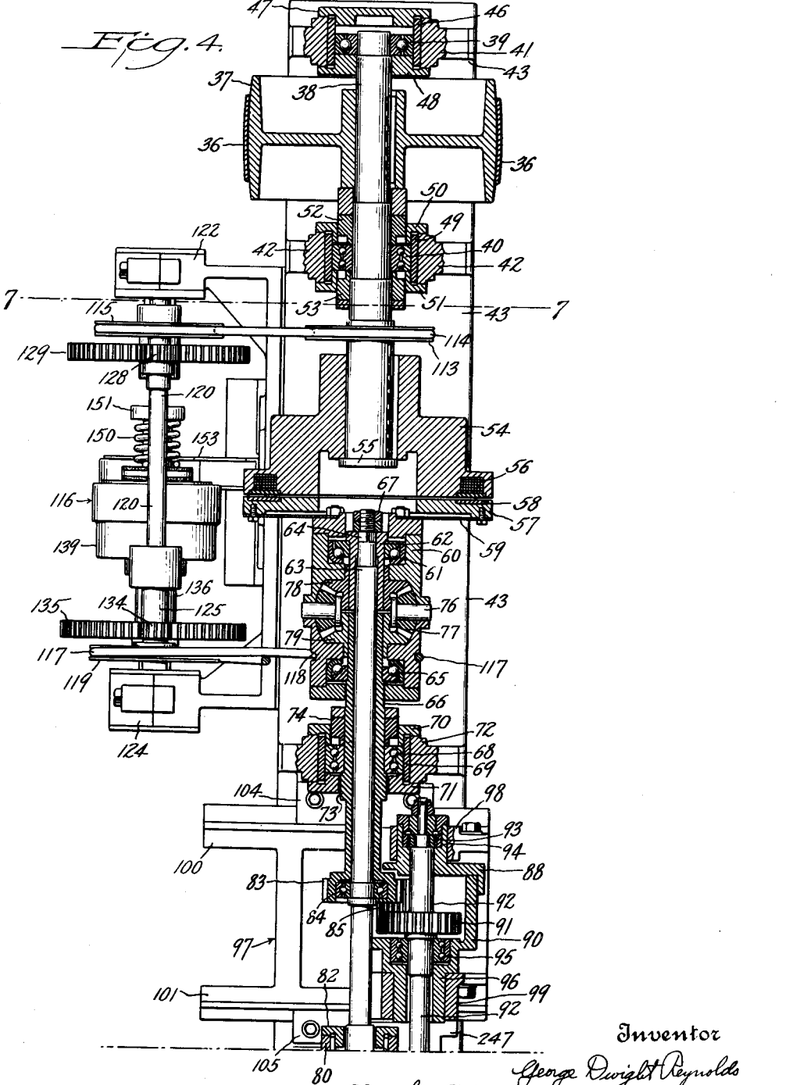
Fig. 4 is a vertical section of the upper part of the machine taken on line 4—4 of Fig. 3.
Figure 5:
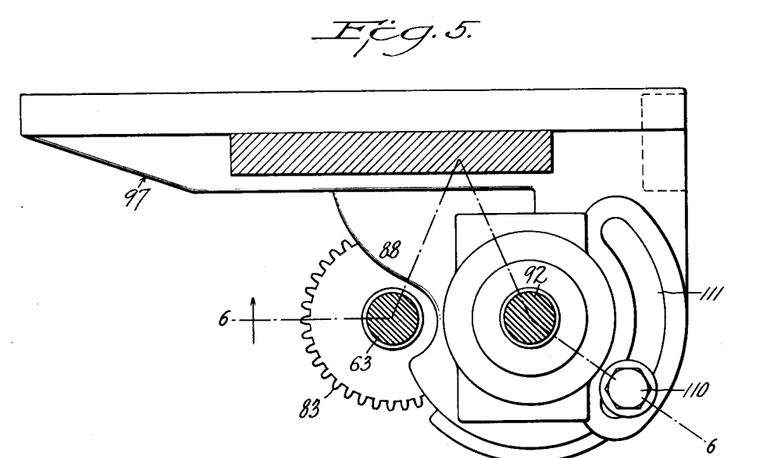
Fig. 5 is a horizontal sectional view of the apparatus taken on line 5—5 of Fig. 6.
Figure 6:
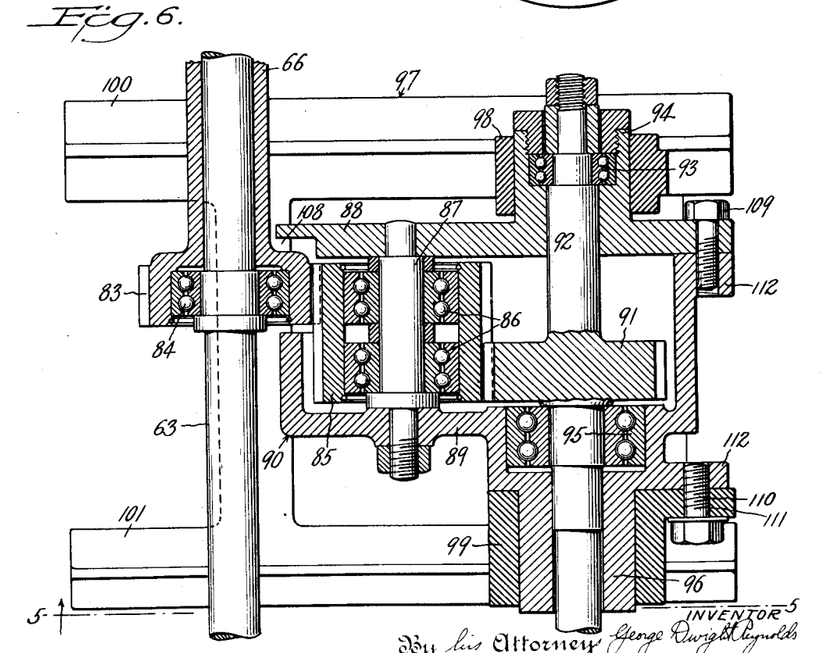
Fig. 6 is a vertical sectional view taken on line 6—6 of Fig. 5.

As shown particularly in Figs. 4, 5 and 6, the teeth on the outer surface of the hub 83 of the quill 66 mesh with the upper teeth of an elongated gear 85 supported by means of ball bearings 86 on a short shaft 87 and mounted in the upper and lower walls 88 and 89 of a gear housing 90. The lower part of the gear 85 meshes with a gear 91 rigidly or integrally secured on a vertical shaft 92 parallel to the shaft 63, and journaled at its upper end in a ball bearing 93 on a boss 94 in the upper housing wall 88, and journaled by means of ball bearings 95 in a sleeve 96 extending downwardly from the lower housing wall 89. On the lower end of the shaft 92 is mounted the nut socket or wrench 35. The gear housing 90 is mounted on a cross or horizontal slide or frame 97 having upper and lower caps or straps 98 and 99, respectively, encircling and supporting the bosses 94 and 96.

The horizontal frame or slide 97 is provided with upper and lower cross rails 100 and 101, respectively, which may be clamped against corresponding supporting surfaces 102 and 103 on the front part of the column 43 by means of clamping plates 104 and 105 and tightening nuts 106 and 107. Upon loosening the nuts 106 and 107 and plates 104 and 105, the frame 97 may be slid horizontally to space the spindles 63 and 92 at any desired distance apart. When the spindles have been spaced at the desired distance the plates 105 and 104 are tightened against the rails 100 and 101 of the horizontal slide 97 by means of the nuts 106, 107. The housing 90 is then swung in the supporting collar 98 and 99 about the axis of the shaft 92 until the teeth of the gear 85 are brought to mesh with the gear teeth on the enlarged hub 83 of the sleeve or quill 66, an opening 108 being provided in the housing 90 for the admission of a part of the enlarged hub 83.

When the gear housing 90 has been thrown to the required position, it is fixed in position on the supporting frame or slide by means of lower cap screws 110 which pass through arcuate slots 111 in the supporting collar 99 and thread into bosses 112 in the gear housing 90.

The operation of the above mechanism is briefly as follows: The rotation of the pulley 37 is transmitted through the shaft 38 to the magnetic clutch element 54 and through the lower clutch element 57 to the differential housing 60. By means of the intermediate gears 77 the rotation of the housing 60 is transmitted to the upper gears 78 and upper sleeve or quill 62 to the central shaft 63, and through the lower bevel gear 79 to the sleeve or quill 66 encircling and freely rotatable on the shaft 63. Through the shaft 63 the rotary motion is transmitted directly to the nut socket or wrench 34, and from the quill or sleeve 66 motion is correspondingly transmitted to the toothed hub 83, gear 85 and gear 91 to the shaft 92, and thence directly to the nut socket or wrench 35. In the event that greater resistance should be at any time offered to the rotation of the socket 34 than to the socket 35, the bevel gears 78 would tend to slow down, thereby increasing the speed of the bevel gear 79 and causing the rotation of the socket 35 to speed up until it tightens to the same extent as the socket 34. Reversely, an increased resistance offered to the socket 35 relative to that offered to the socket 34 would cause the lower bevel gear 79 of the differential to slow down and proportionately increase the speed of the socket 34 until both rotated against the same resistance and with equal force or torque.

When the sockets or wrenches 34 and 35 tighten the nuts to the determined degree, the resistance offered to their rotation is transmitted to the clutch member 57 which thereupon slips relatively to the upper clutch member 54, thus enabling the nut sockets or wrenches to remain stationary. When this occurs the circuit through the electro-magnets 56 of the clutch is broken and the magnets de-energized so that no further tractive force or torsion is exerted on the clutch member 57 and its associated mechanism.

In the preferred embodiment of the invention, this breaking of the circuit through the magnetic clutch is accomplished automatically upon the slipping of the clutch. To this end, in the embodiment shown in Figs. 3, 4, 7 and 8, the rotation of the driving shaft 38 is transmitted through a grooved pulley 113 and a belt 114 to the upper grooved pulley 115 of a control device 116. The rotation of the differential housing 60 is transmitted in reversed direction by means of a crossed belt 117 running in a groove 118 on the outer surface of the differential casing and on a grooved pulley 119 at the lower end of the control device 116. The upper pulley 115 is splined and rigidly secured directly on a vertical shaft 120. The shaft 120 is journaled at its upper end in a ball bearing 121 on the outer end of a bracket 122 secured to the side of the upper column 43, and is journaled at its lower end in a ball bearing 123 in a lower bracket 124.

The pulley 119 is mounted on a sleeve 125 encircling the lower part of the shaft 120 and journaled at its upper end on the shaft 120 by means of a ball bearing 126, and journaled at its lower end by a ball bearing 127 in the bracket 124.

The rotation of the shaft 120 is transmitted through a gear 128 mounted thereon and through a gear 129 to a vertical shaft 130 on which the gear 129 is keyed. The shaft 130 is journaled at its upper end in a ball bearing 131 in the bracket 122 and at its lower end in a ball bearing 132 in the lower bracket 124, and carries approximately midway of its length, a small central or sun gear 133 of a planetary gear train. The motion of the sleeve 125 is transmitted through gear teeth 134 formed in its outer surface to a large gear 135 splined to a sleeve 136 encircling the vertical shaft 130. The sleeve 136 is journaled at its lower end in ball bearings 137 carried by the bracket 124, and at its upper end is journalled on the shaft 130 and free to rotate thereon by ball bearings 138. The upper end portion of the sleeve 136 is enlarged to form a housing 139 having rigidly mounted in its inner circumference an internally toothed orbit gear 140 encircling and spaced from the sun gear 133. Planetary gears 141 are rotatably mounted on shafts 142 between and meshing with the sun and orbit gears 133 and 140. The shafts 142 are journaled at their lower ends in a rotatable ring 143, and at their upper ends in a flat disc 144 having a sleeve 145 projecting upwardly a distance about the shaft 130.

From the above construction it will be apparent that the shaft 130 and the sun gear 133 are always rotated at a fixed speed by the motion transmitted from the shaft 38 through the pulley 113, belt 114, pulley 115, shaft 120 and gears 128, 129. Similarly, when the differential housing 60 is rotated at the same speed as the driving shaft 38, the orbit gear 140 and housing 139 are driven in the reverse direction through the belt 117, pulley 119 and gears 134 and 135. The transmission mechanism is, however, so designed that even though the speeds of the shaft 38 and of the differential housing 60 are the same, a somewhat greater speed will be imparted to the housing 139 and orbit gear 140 than to the sun gear 133, and thus the gears 141 and their supporting shafts 142 will be rotated in a corresponding direction about the axis of the shaft 130 carrying with them the ring 143 and disc 144. From the rotational movement thus imparted to the disc 144, a turning torque is transmitted through a pair of friction discs 147 and 148 to a rotatable arm 149 pivotally mounted on the sleeve 145. The friction discs 147 and 148 are pressed against the arm 149 and against the outer surface of the disc 144 by means of a spring 150 encircling the sleeve 145 and compressed between the outer friction disc 148 and the nut or collar 151 threaded on the outer end of the sleeve 145. The motion thus imparted to the arm 149 tends to throw it clockwise, as in Fig. 7, and holds it tightly against an adjustable screw stop 152 mounted on a bracket 153 projecting from the column 43.

Mounted on the outer end of the arm 149 is a cross rod 154 which is insulated from the arm 149 by layers of insulation 155. On one of the projecting lengths of the rod 154 is mounted a contact sleeve 156 separated from contact with the rod 154 by means of an intervening cylinder 157 of insulation, and by end insulator discs 158. When the arm 149 is rotated and held against the stop 152, the contact sleeve 156 contacts with and bridges a pair of stationary contacts 159, which closes the circuit through the electro-magnetic clutch 56. The circuit through the contacts 159 and electro-magnetic cluth 56 is shown in Fig. 13, in which current flows from a generator or source of current 160 through wires 161 to the contacts 159, and thence returns through a rheostat 162, the electro-magnetic clutch 56 and return wires.

When the differential housing 60 is caused to slow down or stop by the increased resistance from the tightened nuts or screws, this being possible due to a slippage of the lower magnetic clutch element 57 relative to the upper clutch element 54, the orbit gear 140 correspondingly slows down and, when its speed is less than that of the sun gear 133, the planetary gears 141 rotate in a reverse direction carrying with them their shafts 142 and the disc 144. Through the friction discs or plates 147 and 148 reverse movement is transmitted to the arm 149 which is thus caused to swing counter-clockwise to the position shown in dotted lines in Fig. 7 until it is stopped by an adjustable screw stop 164 mounted on an extension 165 of the bracket 153.

In this position the contacts 159 are no longer bridged and the circuit through the rheostat 162 and electro-magnet 56 is broken, the magnetic clutch is de-energized and the lower clutch element released from further rotating force or torque. The foot pedal 29 may then be lifted, permitting the work table 24 and brackets 23 to be lowered and a new connecting rod to be inserted on the bracket 23 and a new pair of nuts to be placed in the nut sockets or wrenches 34 and 35 for assembly.

To again start the machine, the pedal 29 is again depressed, raising the link 31 and rod 32 and the guide 25. As the guide 25 rises, it closes an alternative circuit through the electro-magnetic clutch 56. This circuit comprises the wire 161 and a branch wire 163 and a switch 164 which is pivoted at 165 and normally held in open position by means of a spring 166. As the guide 25 moves upwardly a latch 167 pivoted on a bracket 168 carried on the guide 25, presses the end of the switch lever 164 which is provided with an anti-friction roller 169, and swings the lever 164 to bridge a pair of contacts 170 and 171. As the latch 167 rises past the anti-friction roller 169 it permits the lever 164 to be drawn to open position again. Upon a subsequent lowering of the guide 25 the latch 167 swings upwardly on its pivot 172 until it has been lowered below the end of the lever 164, thereby avoiding a closure of the switch in its downward movement.

Figure 7:
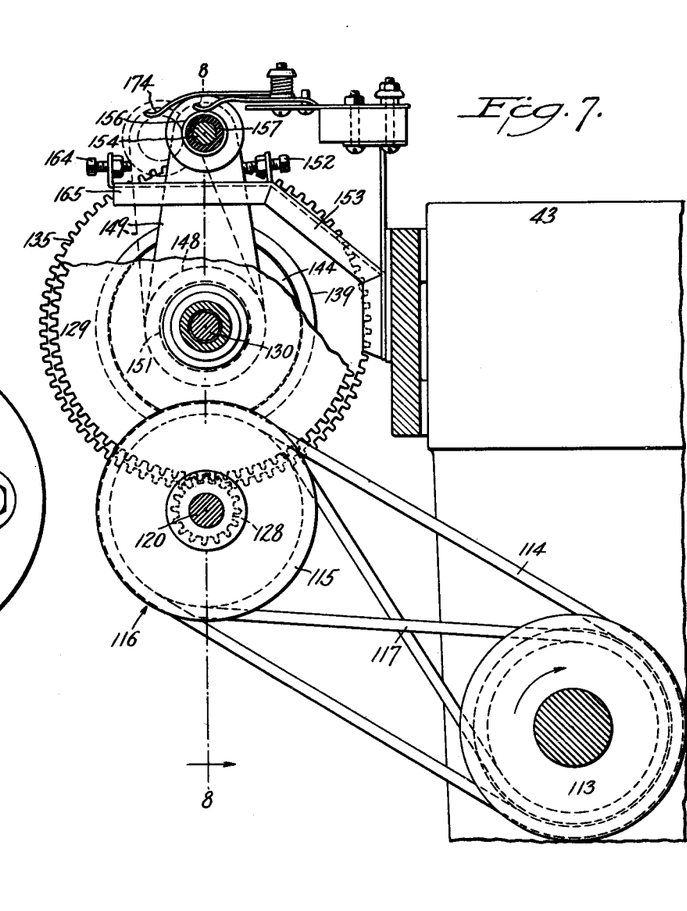
Fig. 7 is a section of the upper part of the machine shown taken on line 7—7 of Fig. 4.
Figure 8:
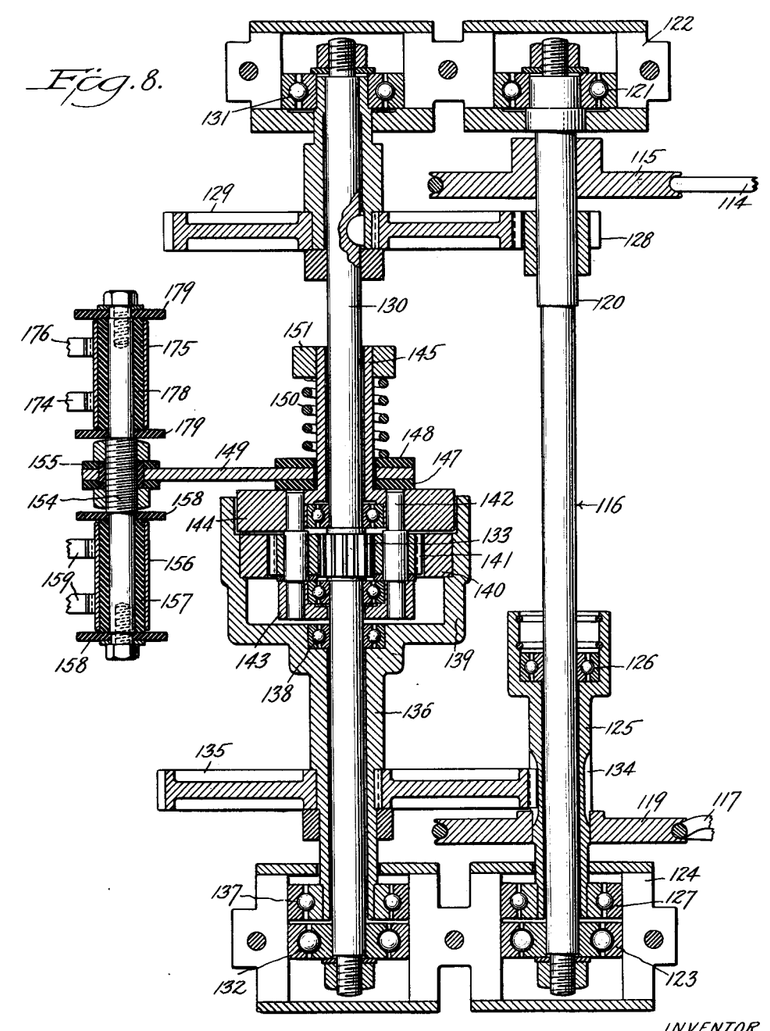
Fig. 8 is a vertical sectional view of a portion of the apparatus shown in Fig. 7 taken on line 8—8 of Fig. 7.

While the switch 164 is closed the current flows from the contact 171 through a wire 173 to a contact 174, shown also in Figs. 3, 7 and 8. When the arm 149 is in the position shown in dotted lines in Fig. 7, a metallic sleeve 175, carried on a projection of the rod 154 opposite to that on which the sleeve 156 is mounted, is brought into contact with the contact 174 and also into contact with a fixed contact 176 which is connected directly to the magnet 56 of the clutch by means of a wire 177, thereby by-passing the rheostat 162. The contacting sleeve 175 is insulated from the rod 154 by means of insulating cylinders and discs 178 and 179, similar to the contact sleeve 156.

Upon the energizing of the magnets 56 by the by-pass current through the switch 164 and contacts 174 and 176, the clutch is engaged and the differential housing rotates the arm 149 clockwise, disconnecting the circuit through the by-pass line 177 and again connecting the clutch magnets 56 to the rheostat 162. Accordingly, when the switch 164 is opened by the completion of the movement of the guide 25, the circuit through the clutch is maintained through the contacts 159 and rheostat 162. With this arrangement, by a suitable adjustment of the resistance in the rheostat 162, the magnetization of the magnet 56 during the running of the machine may be adjusted independently of the minimum amount of magnetism required to attract the lower clutch element 57 to the upper clutch element 54.

When the machine is to be used at all times for assemblies with a torque equal to, or greater than, that corresponding to the magnetism required to close the clutch, the contacts 174 and 176 and rheostat 162 may be omitted and simpler means, such as a push button manipulated by the operator, may be provided for closing the circuit and opening it upon the slippage of the clutch.

In the alternative form of embodiment shown in Figs. 9, 10, 11 and 12, the movement of the differential housing 60 is alone used to control the electric switches to the rheostat and by-pass circuits. In this arrangement when the differential casing or housing 60 is at rest, the switches are so positioned as to open the circuit through the rheostat 162, but, when the differential casing is rotating it rotates a centrifugal governor which closes the circuit through the rheostat and opens the by-pass circuit. When the differential casing comes to rest, the centrifugal action ceases and a spring opens the switch through the rheostat circuit.

Figure 9:
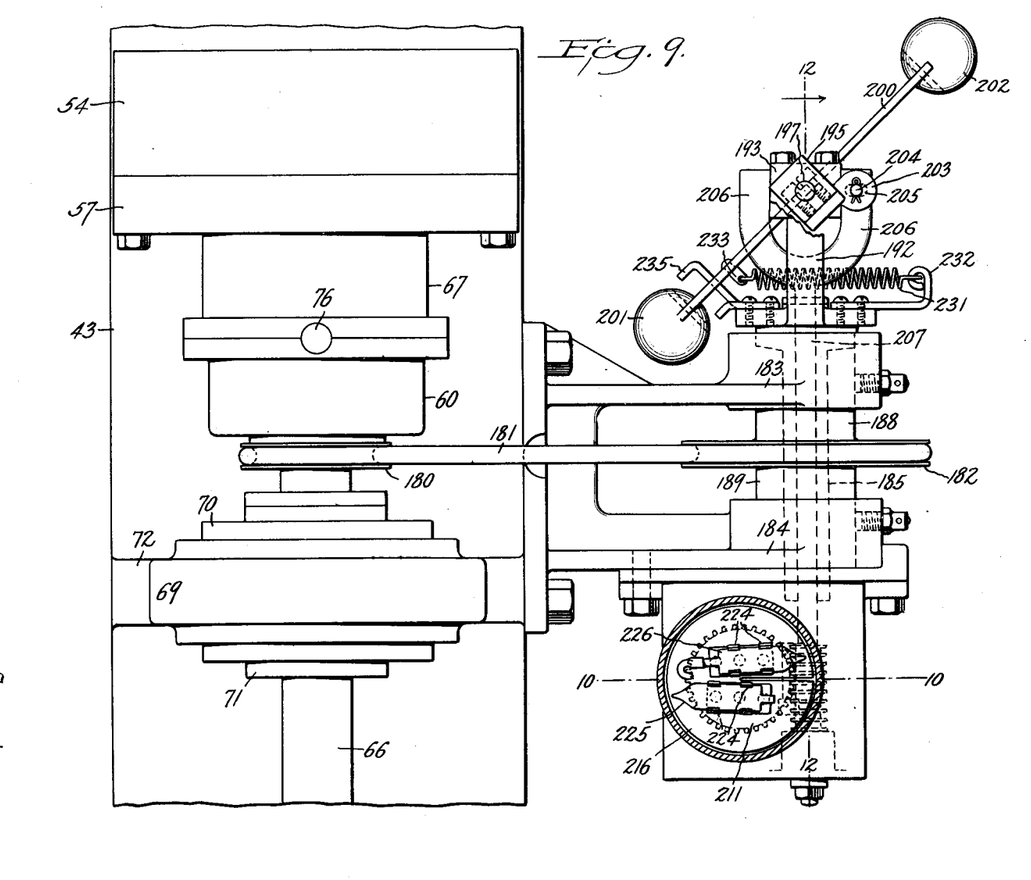
Fig. 9 is a vertical front view of the upper part of the apparatus showing a modified form of embodiment of a torque controlling apparatus.
Figure 10:
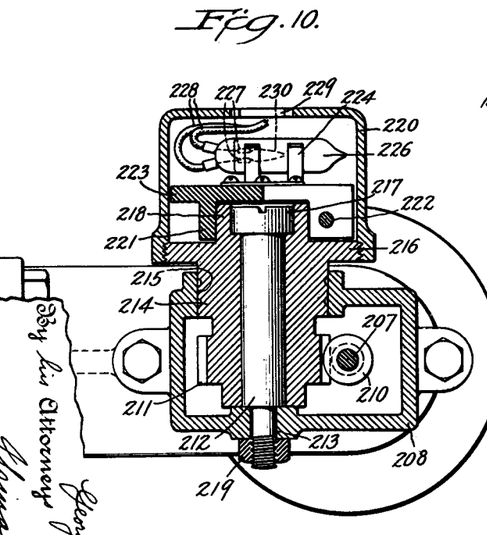
Fig. 10 is a horizontal sectional view taken on the line 10—10 of Fig. 9.
Figures 11, 12:
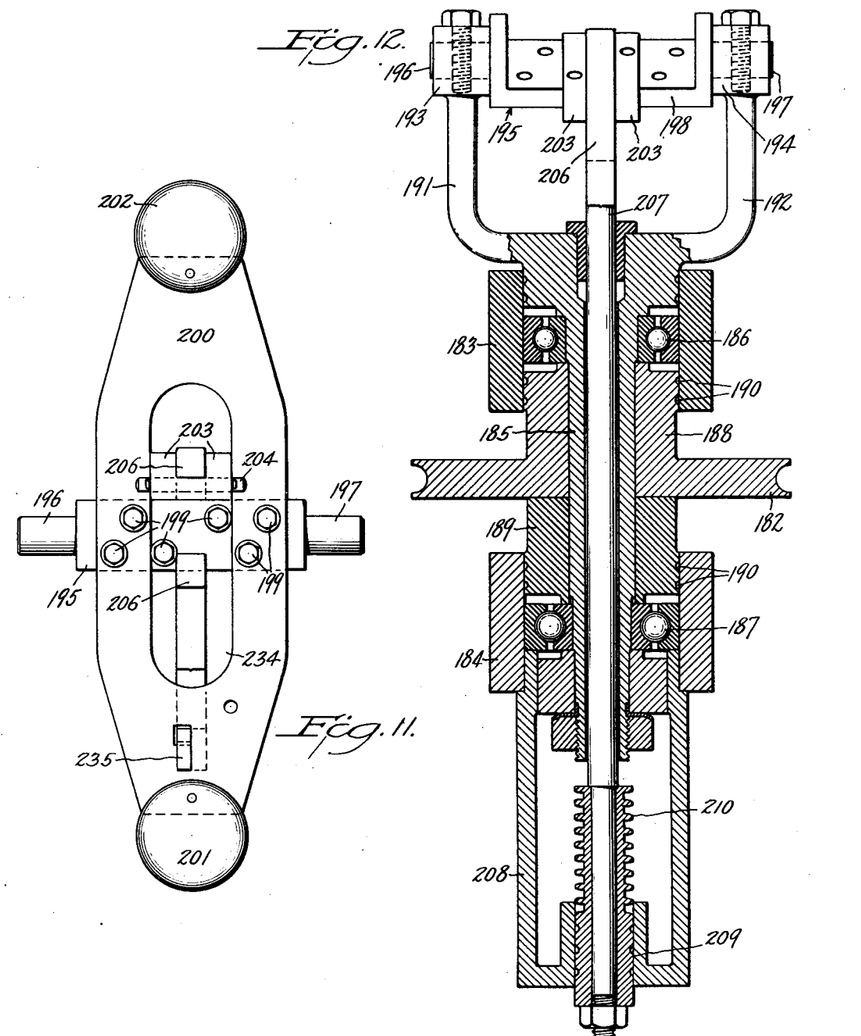
Fig. 11 is a plan view of the upper part of the control device shown in Fig. 9, showing the centrifugal elements.
Fig. 12 is a vertical sectional view of the apparatus taken on line 12—12 of Fig. 9.

Referring more particularly to Figs. 9 and 12 the lower end of the differential housing or casing 60 is provided with a grooved pulley 180 which, through a belt 181, drives a grooved pulley 182 positioned between a pair of horizontal brackets 183 and 184 projecting sidewise from the column 43.

The pulley 182 is rigidly mounted or keyed on a hollow shaft 185 journaled in ball bearings 186 and 187 in the upper and lower brackets 183 and 184, respectively. The pulley 182 is spaced between the ball bearings 186 and 187 by means of a hub 188 and a spacing ring 189 respectively, suitable oil grooves being provided in the hub and spacing rings. The upper end of the hollow shaft 185 is forked and provided with a pair of upwardly extending arms 191 and 192, at the upper end of which are provided bearings 193 and 194 respectively. Pivotally mounted in the bearings 193 and 194 is a rock shaft 195 having trunnions 196 and 197 journaled in the bearings 193 and 194, respectively, and having a slightly offset flat connectng plate 198 extending from one side of the trunnions to the other. Mounted on the plate 198 by means of screws or bolts 199, as indicated in Figs. 9 and 11, and extending symmetrically on each side of the axis of the shaft, is a flat wing or plate 200. The center line of the plate or wing 200 is at the axis of the shaft 195, and on the opposite ends of the plate are mounted weights 201 and 202.

It will be obvious that when the pulley 182 is rotated, it rotates the shaft 185, arms 191 and 192 and the cross shaft 195 and plate 200 about the vertical axis of the shaft 185. Through the centrifugal force caused by this rotation on the weights 201, 202, the plate 200 will be tilted toward a horiontal position at right angles to the axis of the shaft 185 and, being rigidly bolted to the cross shaft 195, will correspondingly tilt the latter.

On the lower part of the plate 198 of the cross shaft 195 are mounted a pair of spaced ears 203 carrying a cross-pin 204 which is thereby swung downwardly in a vertical arc as the plate 200 tilts toward a horizontal position. The cross-pin 204 extends through a horizontally elongated slot 205 in one of a pair of balanced arms 206 extending upwardly from a vertical spindle 207 to a position between the ears 203. Accordingly, when the plate 200 is rotated by centrifugal action toward a horizontal position and the pin 204 is swung downwardly, the arms 206 and the stem 207 are depressed. The arms 206 and stem 207 rotate with, and the stem 207 extends co-axially through the hollow shaft 185 and through a chamber 208 mounted on the lower part of the bracket 184.

Mounted on the lower part of the stem 207 and guided in an opening 209 in the lower part of the chamber 208 is a cylindrical rack 210 which rotates with the stem 207 and moves upwardly and downwardly with the movement of the latter. The teeth of the rack 210 mesh with a pinion 211, Figs. 9 and 10, rotatably mounted on a horizontal shaft 212 secured at one end in an opening 213 in the side wall of the chamber 208. At the opposite side from the opening 213 the gear 211 is provided with an enlarged hub 214 journaled in an enlarged bearing opening 215 in the opposite wall of the chamber 208. The hub 214 extends beyond the outer surface of the wall of the chamber 208, and on this projecting portion is formed an enlarged disc 216 having its periphery threaded. The shaft 212 is held in position on the inner wall of the chamber 208 and holds the hub 214 and pinion 211 by means of a head 217 fitting a recess in a projecting boss 218 on the outer face of the disc 216 by a nut 219 on the opposite projecting end of the shaft which tightens against the bearing 213.

It will be evident that as the pinion is rotated in one direction or the other by the rack 210, it rotates the disc 216 about the horizonal axis of the shaft 212.

Mounted on the disc 216, and rotating therewith, is a mercury switch which comprises a cylindrical housing 220 having a screwthreaded inner edge that may be threaded onto the periphery of the disc 216. Within the housing 220 there is provided a split ring 221 encircling the boss 218 and tightened thereagainst by means of a bolt 222 so that it rotates with the hub 214 when the latter is rotated by the rack 210 and pinion 211. The split ring 221 is provided with a flat face or flange 223 carrying two pair of clips 224, so spaced as to hold lower and upper cylinders 225 and 226 on opposite sides of the axis of the shaft 212, and slightly converging in a horizontal direction so that as the pinion 211, and with it the disc 223, is rotated slightly in one direction or the other, one of the cylinders 225 or 226 will be tilted past a horizontal position. In opposite ends of the cylinders 225 and 226 is a pair of spaced contacts 227 which connect with the wiring system of the rheostat and by-pass circuits respectively, through wires 228 that pass outwardly through an opening 229 in the outer wall of the chamber 220. A small body of mercury 230 is also placed within each of the cylinders 225 and 226 so that as the cylinders tilt in one direction or the other past a horizontal line, the body of mercury will flow into contact with and bridge contacts 227, closing its respective circuit, or flow to the other end of the cylinder and thus break the circuit.

Looking at the apparatus as shown in Fig. 9, when the plate 200 is swung toward horizontal position, the stem 207 and the rack 210 are depressed, rotating the pinion 211 in a clockwise direction. This tilts the disc 226 to a position in which the mercury flows away from the contacts 227 of cylinder 226 and opens the by-pass circuit. At the same time, the cylinder 225 being tilted past horizontal position, the contacts 227 in its circuit are bridged by the mercury, closing the circuit through the rheostat.

When the lower clutch element 57 slips relatively to the clutch element 54 and the differential housing 60 comes to rest, the rotation of the hollow shaft 185 and of the plate 200 ceases. The plate is then drawn to the tilted position shown in Fig. 9 by means of a spring 231, one end of which is retained on a bracket 232 on the upper end of the shaft 185, and the other on a lug 233 on the lower face of the plate 200. The plate 200 is provided with an elongated central opening 234 to enable the arm 206 to project upwardly therethrough without interference when the plate 200 is tilted. The tilting of the plate 200 lifts the stem 207 and rack 210 and rotates the pinion 211 and disc 222 counter-clockwise. This reverses the inclination of the switch solenoids 225 and 226, opening contact through the former and closing it through the latter, thus interrupting the circuit through the rheostat and closing it through the by-pass switch.

In order to limit the tilting of the plate 200, a bracket or projection 235 is provided on the upper end of the shaft 185 extending through an opening in the lower end of the plate 200 and having limiting projections.

The wrenches or nut sockets may be secured to the ends of the spindles 63 or 92 in any suitable manner, and the nuts 21 and 22 may be placed and retained in the sockets by any suitable means.

In the preferred embodiment of the invention the nuts are held in the sockets by magnetic attraction. For this purpose an electro-magnetic solenoid 236 is mounted within a casing 237 and attached, by means of a clamping strap 238, to a cylindrical projection 239 depending from the lower face of the flanged ring 82 of the lower ball bearing 80 in which the shaft 63 is journaled. The coils of the electro-magnet 236 create a magnetic field and magnetize the lower ends of the shaft 63. The nut socket or wrench 34 mounted on the lower end of the shaft 63 must be of relatively non-magnetic material, as otherwise the nut 21, instead of remaining in the socket, would be drawn to the outer edge and thus not be engaged by the socket. Within the lower part of the socket 34, and forming an upper stop for the nut 21, is a steel or iron plug or ring 240 which is magnetized from the shaft 63 and thus attracts the nut and holds it within the lower opening of the socket member 34.

Figure 1:
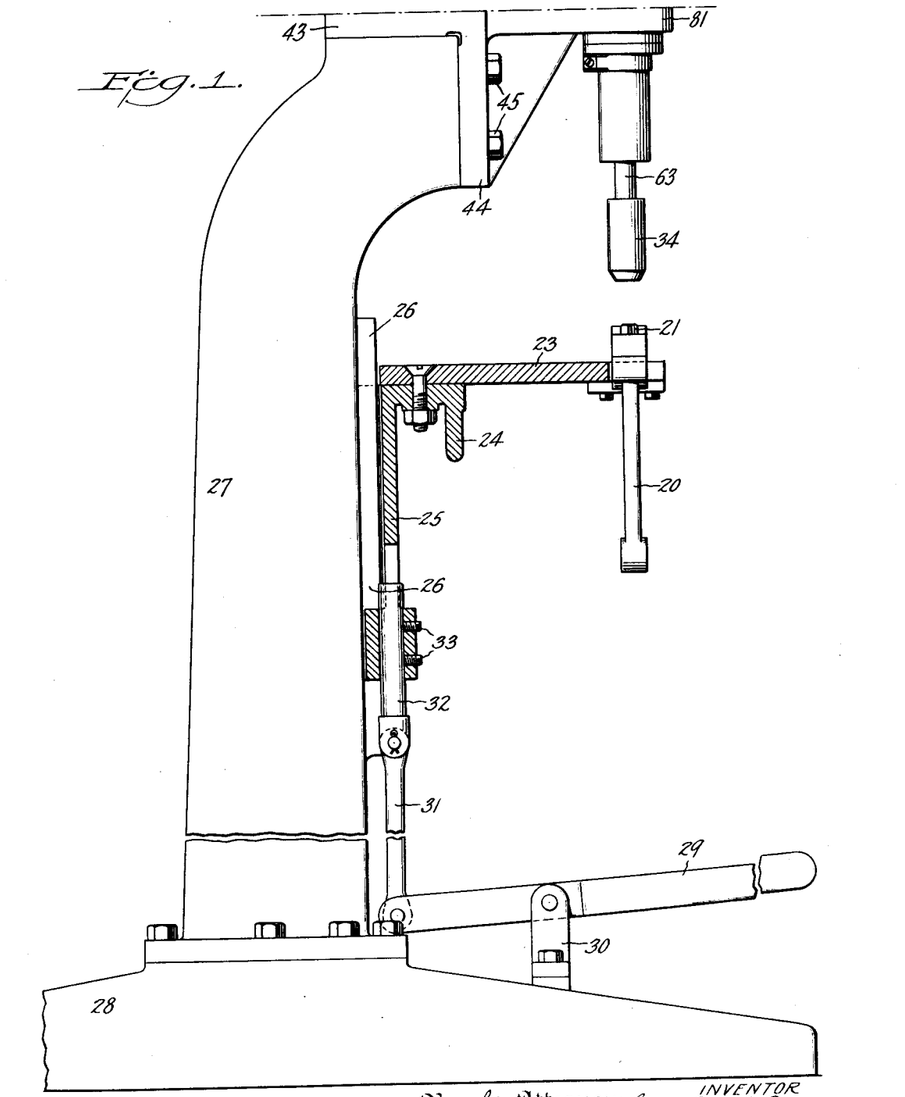
Fig. 1 is a side elevation of the lower part of a machine embodying the preferred form of the invention, and showing the means for holding and bringing the work into position to be assembled.
Figures 2, 14, 15, 16:
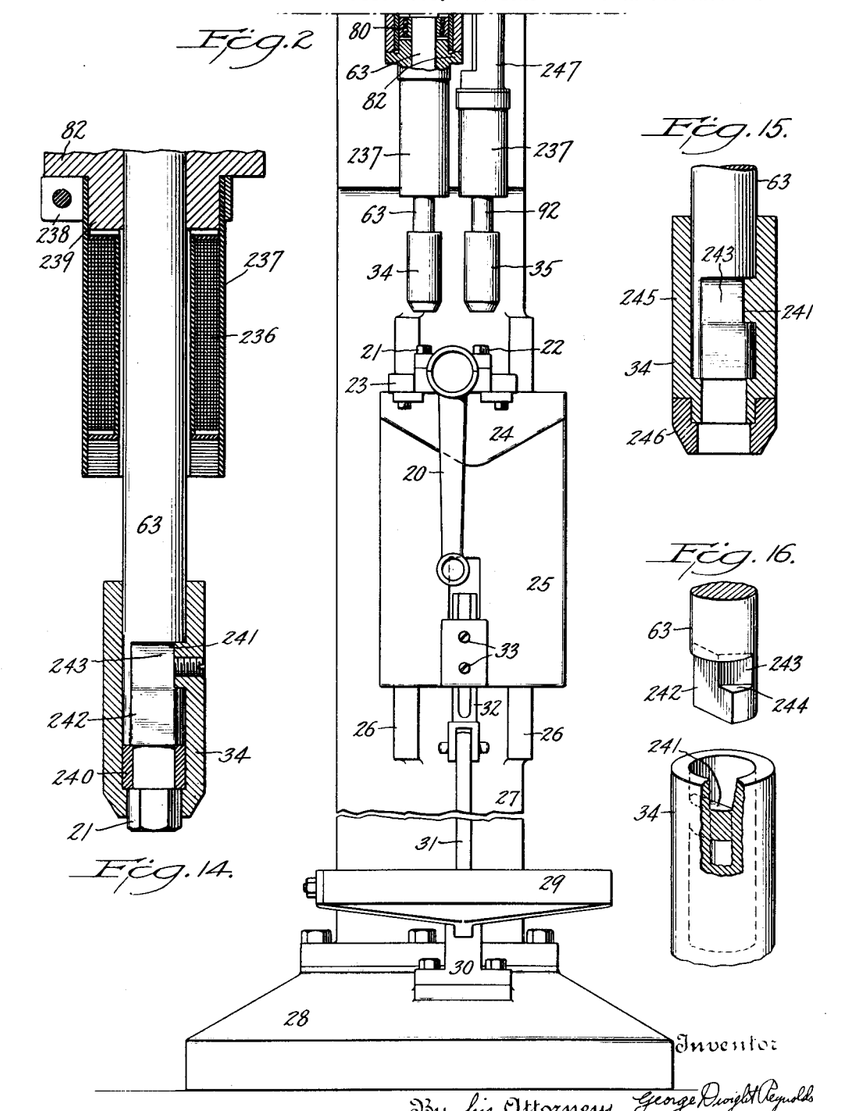
Fig. 2 is a vertical front elevation of the portion of the machine shown in Fig. 1.
Figs. 14, 15 and 16 are sectional and perpective views showing various details of the wrench or work holding sockets.

The socket member 34 may be mounted by a bayonet joint construction shown in perspective in Fig. 16. In this construction an arc or chord shaped ledge 241 is formed integrally in the upper part of the inner opening of the socket member to lie transversely of the axis of the socket. The lower face of the spindle 63 is cut on a plane 242, the cross section of which forms a chord of the circumference of the spindle, and is so dimensioned that it permits the ledge 241 to slide upwardly. A second cut 243 at an angle to the plane 242 is formed a short distance from the lower end of the spindle 63, forming a shoulder 244 that will receive the ledge 241 when the latter has been moved to its extreme upward position, and then given a right handed turn. The rotation of the spindle will prevent the socket from turning free of the shoulders 244.

In the modified form of construction shown in Fig. 15 the upper part 245 of the socket 34 is formed of a magnetic metal such as steel or iron, and the lower part 246 may be formed of a non-magnetic alloy.

The construction and arrangement of the wrench socket 35 is similar to that of socket 34 except that instead of the solenoid casing 237 being supported directly from the lower end of the boss 96 of the gear casing 90, a standard or extension 247 is mounted on the lower end of the boss and the casing 237 is then mounted on the lower end of this standard.

Through the above invention, therefore, various parts may be assembled with a uniform force. Not only is the final tightening stress equal for all of the members but, the various members being assembled tighten progressively with uniform, equalized pressure. The invention also provides a means whereby when the desired tightness is attained, further application of force is terminated automatically.

Although only a pair of tool or wrench holding spindles have been illustrated in the above embodiment, it will be obvious that the number of such spindles may be increased, within the scope of my present invention, to meet any desired condition.

As changes of construction could be made within the scope of my invention, it is intended that all matter contained in the above description or shown in the accompanying drawings shall be interpreted as illustrative and not in a limiting sense.

What I claim is:

1. Apparatus of the type described which comprises a driving means, power applying means for said driving means, driven tool carrying spindles, a yielding clutch and a torque equalizing means between said driving means and said spindles, and means controlled by the yielding of said clutch to disengage said power applying means.

2. Apparatus of the type described, which comprises a driving means, a plurality of driven tool holding means, torque equalizing means between said driving and said driven means, a yieldable clutch adapted to permit relative movement of said driving and driven elements under a definite limiting resistance, and means to interrupt said driving means upon the yielding of said clutch.

3. Apparatus of the type described which comprises a plurality of tool holding devices, a driving element, torque equalizing transmission between said tool holding devices and said driving element for simultaneously driving said tool holding devices from said driving element with an equalized torque and means for limiting said torque.

4. Apparatus of the type described which comprises a number of rotating tool holders, a driving means, a differential torque equalizing transmission from said driving means to said tool holders, and means for interrupting said driving means when the torque transmitted to said tool holders reaches a definite limit.

5. Apparatus of the type described which comprises a pair of tool spindles, a drive element, a torque equalizing transmission from said drive element to said spindles, and means to vary the distance between said spindles.

6. Apparatus of the type described which comprises a driving element, a pair of tool spindles, said spindles being movably mounted at a variable distance from each other, a differential between said driving element and said spindles, and a floating gear between one of said spindles and said differential.

7. Apparatus of the type described which comprises a number of tool holding means, a common driving means for said tool holding means, transmission mechanism from said common driving means to said tool holding means, means in said transmission mechanism for equalizing the torque among said tool holding means, and means for limiting the torque applied to said tool holding means.

8. Apparatus of the type described which comprises a plurality of tool holding means, a driving means for said tool holding means, an electro-magnetic clutch and torque equalizing means between said driving and said tool holding means, means for initially passing a current through said clutch and for diminishing said current upon the rotation of the driven element of the clutch, and means for opening the circuit through said clutch upon the decrease in motion of said driven element.

9. Apparatus of the type described which comprises a number of driven elements, a magnetic clutch having a driven element connected to said driven elements and a driving element torque equalizing means between said clutch and said driven elements, and means for opening the circuit of said electro-magnet when the speed of said driven element decreases relatively to that of said driving clutch element.

10. Apparatus of the type described which comprises a pair of rotatable tool holding spindles, a torque limiting driving means, differential gearing, means connecting the intermediate gear of said differential gears to said driving means and for connecting the driven gears of said differential gears individually to said spindles.

11. Apparatus of the type described which comprises a driving means having a torque limiting clutch element, a driven clutch element, a differential gear housing driven from said driven clutch element, differential gears in said housing, a tool carrying shaft driven by one of the driven gears of said differential gears, a sleeve co-axial with said shaft and driven by the other differential gear of said differential gearing, a tool carrying shaft spaced from said differential driven shaft, and means gearing said last named shaft to said sleeve.

12. Apparatus of the type described which comprises a driving means having a magnetic torque limiting clutch element, a driven clutch element, a differential gear housing driven from said driven clutch element, differential gears in said housing, a tool carrying shaft driven by one of the driven gears of said differential gears, a sleeve co-axial with said shaft and driven by the other differential gears of said differential gearing, a tool carrying shaft spaced from said differential driven shaft, gears on said sleeve and said second shaft, means for moving said second shaft to a greater or less distance from said first shaft and said sleeve, and a connecting gear movable to mesh with the gears of said sleeve and said second shaft.

13. Apparatus of the type described which comprises a driving means having a torsion release clutch element, a driven clutch element, a differential gear housing driven from said driven clutch element, differential gears in said housing, a tool carrying shaft driven by one of the driven gears of said differential gears, a sleeve co-axial with said shaft and driven by the other differential gear of said differential gearing, a second tool carrying shaft spaced from said differential driven shaft, means gearing said shaft to said sleeve.

14. Apparatus of the type described which comprises a driving shaft, a clutch element mounted thereon, a driven clutch element yieldably driven thereby, a driven shaft, a sleeve rotatably mounted co-axial to said shaft, a pair of gears of an epicyclic train mounted one on said shaft and the other on said sleeve, a driving gear of said epicyclic train driven by the driven clutch element, and a second shaft parallel to said first shaft and driven from said sleeve.

15. Apparatus of the type described which comprises a driving shaft, a clutch element mounted thereon, a driven clutch element yieldably driven thereby, a driven tool carrying shaft, a sleeve rotatably mounted co-axial to said shaft, a pair of gears of an epicyclic train mounted one on said shaft and the other on said sleeve, a driving gear of said epicyclic train driven by the driven clutch element, a gear on said sleeve, a housing movable towards or from said shaft and sleeve, a second tool carrying shaft in said housing, a gear on said second shaft, and a floating gear meshing with said gear of said second shaft and movable to mesh with the gear of said sleeve.

16. A means for simultaneously rotating a plurality of tool carrying mechanisms to a uniform limited torque which comprises a plurality of driven tool carrying means, a driving means, a torque equalizing transmission means and torque limiting means between said driving and said driven means.

17. In apparatus for setting up securing members simultaneously to the same degree of tightness a rotatable spindle, two spindles in juxtaposed parallelism, and means for transmitting the rotation of said first spindle differentially to said two spindles.

18. In apparatus for setting up securing members simultaneously to the same degree of tightness a rotatable spindle, two spindles in juxtaposed parallelism, means for transmitting the rotation of said first spindle differentially to said two spindles, and means on said spindles for engaging securing members disposed in the same plane.

In witness whereof, I have hereunto signed my name.

GEORGE DWIGHT REYNOLDS.